United States Patent
Shoji et al.

(10) Patent No.: US 7,078,875 B2
(45) Date of Patent: Jul. 18, 2006

(54) DC MOTOR CONTROL APPARATUS AND RECORDING APPARATUS

(75) Inventors: Michiharu Shoji, Kanagawa (JP); Hiroyuki Saito, Kanagawa (JP); Nobutsune Kobayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/974,717

(22) Filed: Oct. 28, 2004

(65) Prior Publication Data

US 2005/0093490 A1    May 5, 2005

(30) Foreign Application Priority Data

Oct. 31, 2003    (JP)    ............................. 2003-372459

(51) Int. Cl.
*H02P 7/06* (2006.01)
*B41J 29/38* (2006.01)
*B41J 11/42* (2006.01)

(52) U.S. Cl. ...................... 318/626; 318/648; 318/265; 318/806; 400/279; 101/485; 347/16

(58) Field of Classification Search ...................... None
See application file for complete search history.

(56) References Cited

U.S. PATENT DOCUMENTS

| | | | | |
|---|---|---|---|---|
| 3,882,988 | A | * | 5/1975 | Sloan et al. ............. 400/317.1 |
| 3,950,685 | A | * | 4/1976 | Kramer ....................... 318/561 |
| 4,591,969 | A | * | 5/1986 | Bloom et al. ............... 318/603 |
| 5,998,956 | A | | 12/1999 | Saito |
| 6,065,830 | A | | 5/2000 | Hiramatsu et al. |
| 6,133,706 | A | * | 10/2000 | Quintana .................... 318/640 |
| 6,158,909 | A | * | 12/2000 | McCue et al. .............. 400/582 |
| 6,350,073 | B1 | * | 2/2002 | McCue et al. .............. 400/582 |
| 6,515,445 | B1 | | 2/2003 | Shoji et al. |
| 6,592,198 | B1 | | 7/2003 | Shoji et al. |
| 6,599,043 | B1 | | 7/2003 | Kobayashi et al. |
| 6,702,492 | B1 | | 3/2004 | Saito |
| 6,729,712 | B1 | | 5/2004 | Kobayashi et al. |
| 6,823,132 | B1 | | 11/2004 | Saito et al. |
| 6,824,234 | B1 | | 11/2004 | Sugiyama et al. |
| 6,838,855 | B1 | | 1/2005 | Kobayashi et al. |
| 6,877,837 | B1 | * | 4/2005 | Igarashi et al. ............... 347/37 |
| 2003/0052933 | A1 | | 3/2003 | Shoji |
| 2004/0041854 | A1 | | 3/2004 | Saito et al. |
| 2005/0146555 | A1 | * | 7/2005 | Igarashi et al. ............... 347/37 |

* cited by examiner

*Primary Examiner*—Marlon T. Fletcher
*Assistant Examiner*—Eduardo Colon Santana
(74) *Attorney, Agent, or Firm*—Fitzpatrick, Cella, Harper & Scinto

(57) ABSTRACT

When torque of a DC motor is dropped down to zero at a stop position, force is generated by deformation of a member for transmitting the torque of the DC motor. The force moves the driven body which is in the stopped state, which results in a shift of the driven body from the stop position. Therefore, a process for stopping the driven body is performed according to the amount of shift by an encoder which periodically outputs a pulse signal according to movement of the driven body, a unit for acquiring velocity information and position information of the driven body based on the pulse signal, a controlling unit for controlling a moving unit based on the velocity information and the position information, and a unit for calculating the amount of shift, which is caused by the force generated by the deformation of the member for transmitting the torque, at the stop position of the driven body.

5 Claims, 13 Drawing Sheets

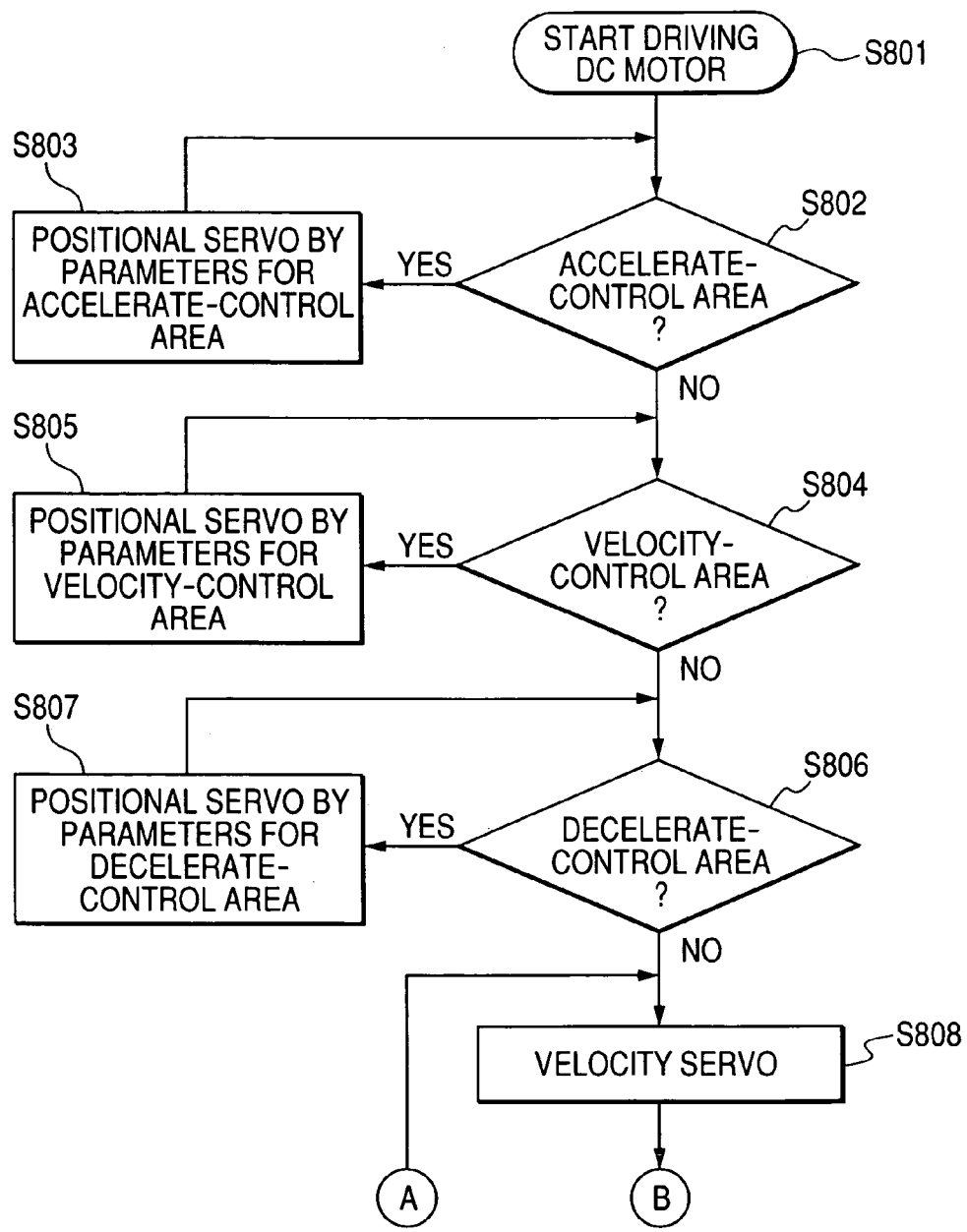

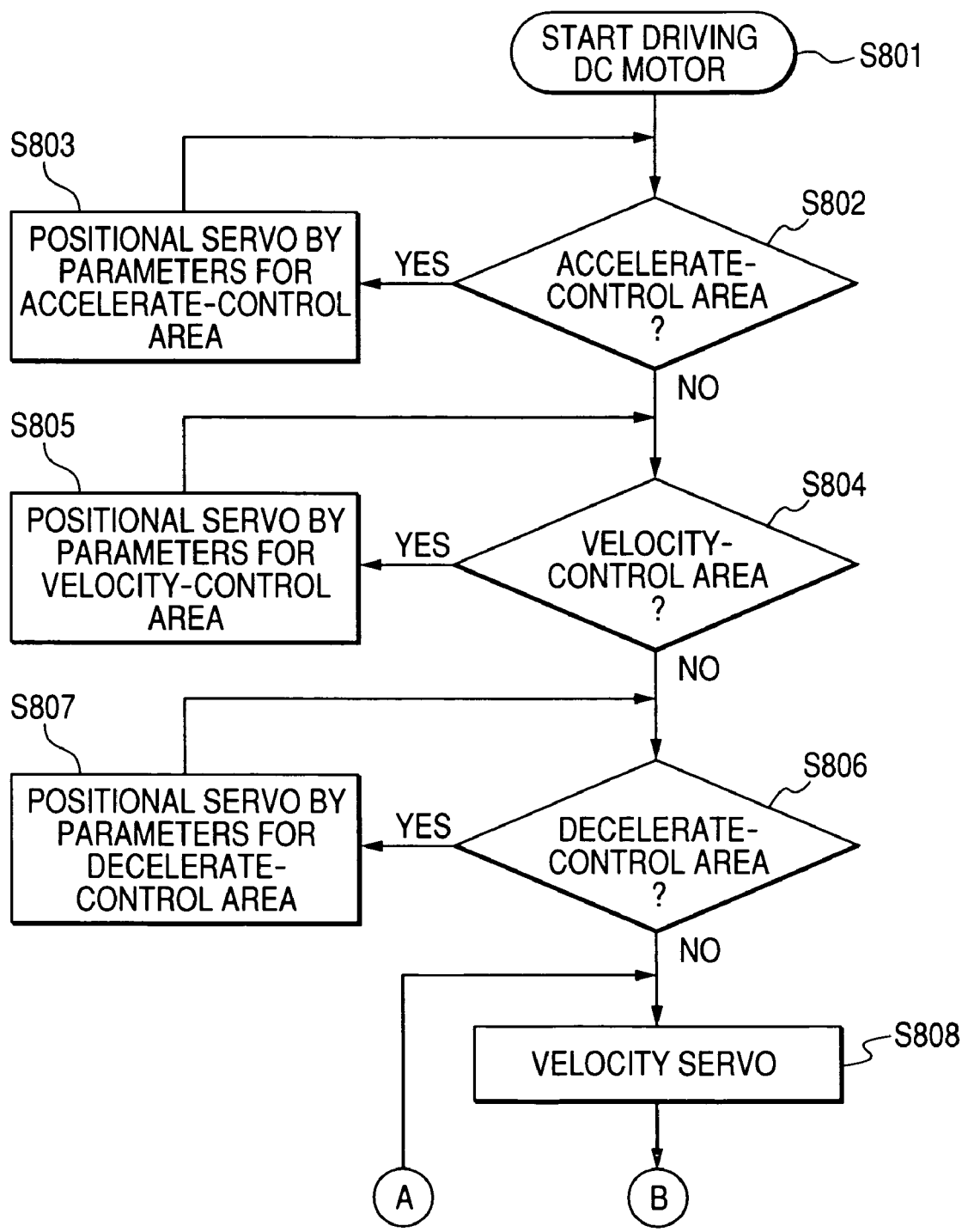

DC MOTOR CONTROL APPARATUS AND RECORDING APPARATUS

BACKGROUND OF THE INVENTION

1. Field of the Invention

The present invention relates to a DC motor control apparatus and a recording apparatus.

2. Related Background Art

Recently, both improvement of image quality and a decrease in moving sound are demanded in a printer. Particularly in an inkjet recording apparatus in which the number of noise sources are small during recording, noise reduction is realized by using a DC motor and a linear encoder as driving means for scanning a recording head.

Further, the DC motor and a rotary encoder are being adopted as driving means for conveying paper. With reference to the noise reduction, such an effect can be expected only by adopting the DC motor. However, in order to convey the paper with high accuracy, high degrees of a stopping control technology and mechanical accuracy are essential.

A technique in which torque of the DC motor is dropped down to zero to stop the DC motor by inertia when the rotation of a roller reaches a target stop position is basically adopted as the method of stopping the DC motor (stopping control).

In addition to the above-described technique, there is proposed a method in which the DC motor is stopped by interrupting passage of electric current to the DC motor after a predetermined time elapses from a time when the rotation of the DC motor is expected to reach a predetermined position in front of the target stop position on the basis of velocity information at a position in front of the target stop position by a predetermined distance.

However, when the torque of the DC motor is dropped down to zero at the target stop position, disturbance (force) is generated in stopping the DC motor by deformation of torque transferring means for transferring the torque of the DC motor (torque transferring member) such as a belt and a gear. Hereinafter the force (disturbance) is referred to as "elastic deformation charging force" in the description. The elastic deformation charging force is generated as the torque in an opposite direction to a drive direction of a driven body. When the torque of the DC motor is dropped down to zero at the target stop position, the driven body is moved by the elastic deformation charging force and the position shift occurs at the stop position.

FIG. 11 is an explanatory view showing the occurrence of the position shift. The sign En represents a position signal based on an encoder signal. For example, in an arrow MV1, a stopping process is performed at timing of En and the front end of a recording medium conveyed by conveying means is stopped at a position Pn (for the sake of convenience, the moving distance is set to zero until the front end of the recording medium is stopped after the stopping process is performed). However, the front end of the recording medium is moved by a distance d and stopped at a position Pn−1 due to the elastic deformation charging force (arrow MV2).

Therefore, when the passage of the electric current to the DC motor is interrupted at the target stop position or in front of the target stop position during servo drive at low velocity, the stop position is shifted by the elastic deformation charging force, and stopping accuracy is worsened.

SUMMARY OF THE INVENTION

In order to solve the above-described problem, a DC motor control apparatus of the invention comprises a DC motor; moving means for receiving drive torque from the DC motor to move a driven body, wherein the moving means includes a torque transmission member which transmits torque from the DC motor, and a predetermined force is generated from the torque transmission member at stop timing of the driven body; encoder means for periodically outputting a pulse signal according to movement of the driven body; information acquiring means for acquiring velocity information and position information of the driven body based on a time interval of the pulse signal; controlling means for controlling the moving means based on the velocity information and the position information acquired by the information acquiring means; calculating means for calculating the amount of shift of a stop position of the driven body by the predetermined force; and means for determining timing when a process for stopping the driven body should be performed based on the amount of shift, wherein the controlling means performs the process for stopping the driven body based on the timing when the stopping process should be performed.

Another DC motor control apparatus of the invention comprises a DC motor; moving means for receiving drive torque from the DC motor to move a driven body; wherein the moving means includes a torque transmission member which transmits torque from the DC motor, and a predetermined force is generated from the torque transmission member at stop timing of the driven body; encoder means for periodically outputting a pulse signal according to movement of the driven body; information acquiring means for acquiring velocity information and position information of the driven body based on a time interval of the pulse signal; torque calculating means for calculating magnitude of the predetermined force; and controlling means for controlling the moving means based on the velocity information and the position information acquired by the information acquiring means, wherein the controlling means outputs the torque calculated by the torque calculating means to the DC motor.

A recording apparatus of the invention, which uses a recording head to perform recording on a recording medium, comprises a DC motor; conveying means for receiving drive torque from the DC motor to move the recording medium, wherein the conveying means includes a torque transmission member which transmits torque from the DC motor, and a predetermined force is generated from the torque transmission member at stop timing of the recording medium; encoder means for periodically outputting a pulse signal according to action of the conveying means; information acquiring means for acquiring velocity information and position information of the conveying means based on a time interval of the pulse signal; controlling means for controlling the conveying means based on the velocity information and the position information acquired by the information acquiring means; calculating means for calculating the amount of shift of a stop position of the recording medium by the predetermined force; and means for determining timing when a stopping process for stopping the recording medium should be performed based on the amount of shift, wherein the controlling means performs the process for stopping the recording medium based on the timing when the stopping process should be performed.

BRIEF DESCRIPTION OF THE DRAWINGS

FIGS. 8A and 8B, combined as shown in FIG. 8, show a flow chart for explaining a first embodiment;

FIGS. 10A and 10B, combined as shown in FIG. 10, show an explanatory view concerning a stop position in the related art;

DETAILED DESCRIPTION OF THE PREFERRED EMBODIMENTS (Explanation Concerning Common Portions of Embodiments)

Figure 1:
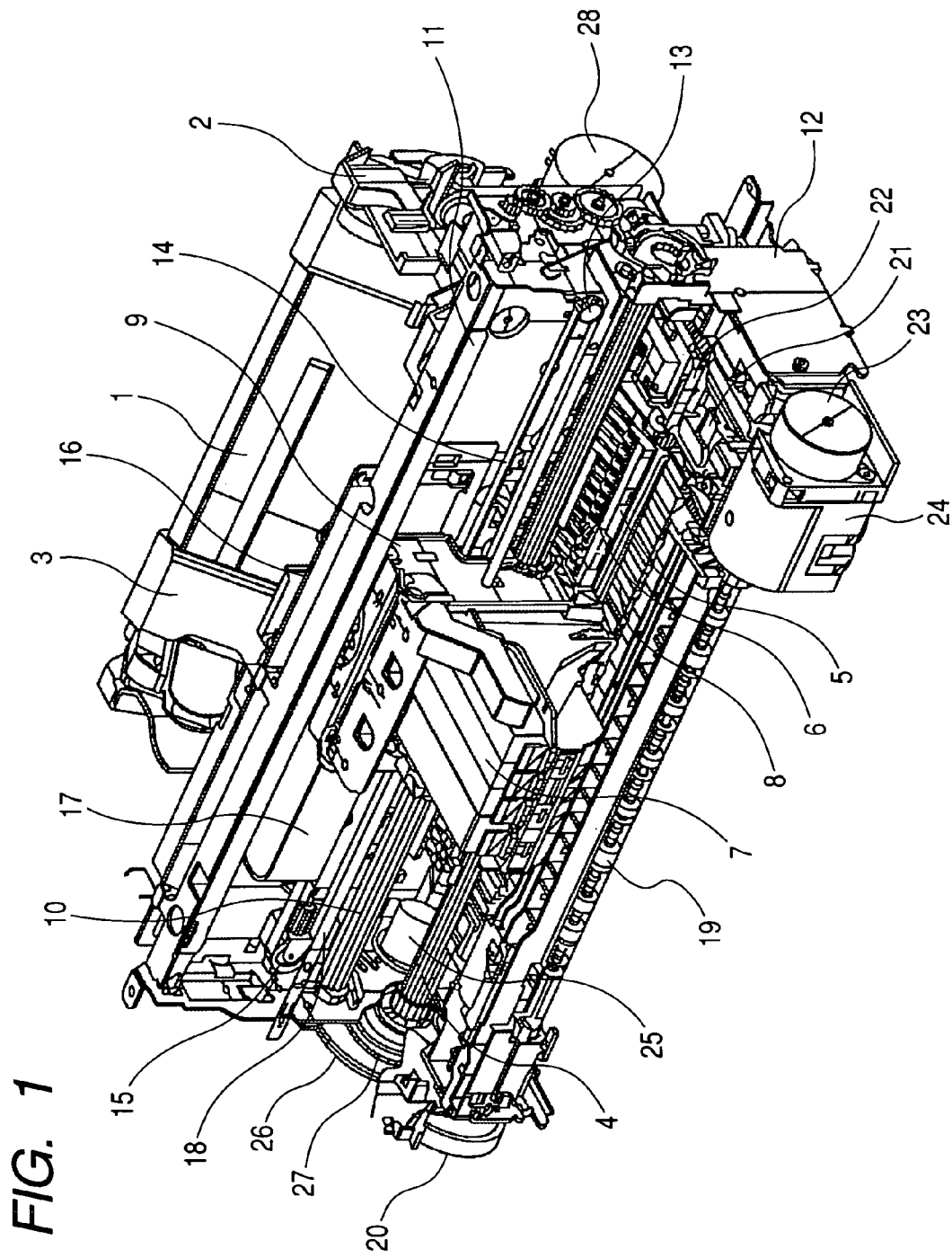
FIG. 1 is a perspective view showing an overall configuration of a recording apparatus.
Figure 2:
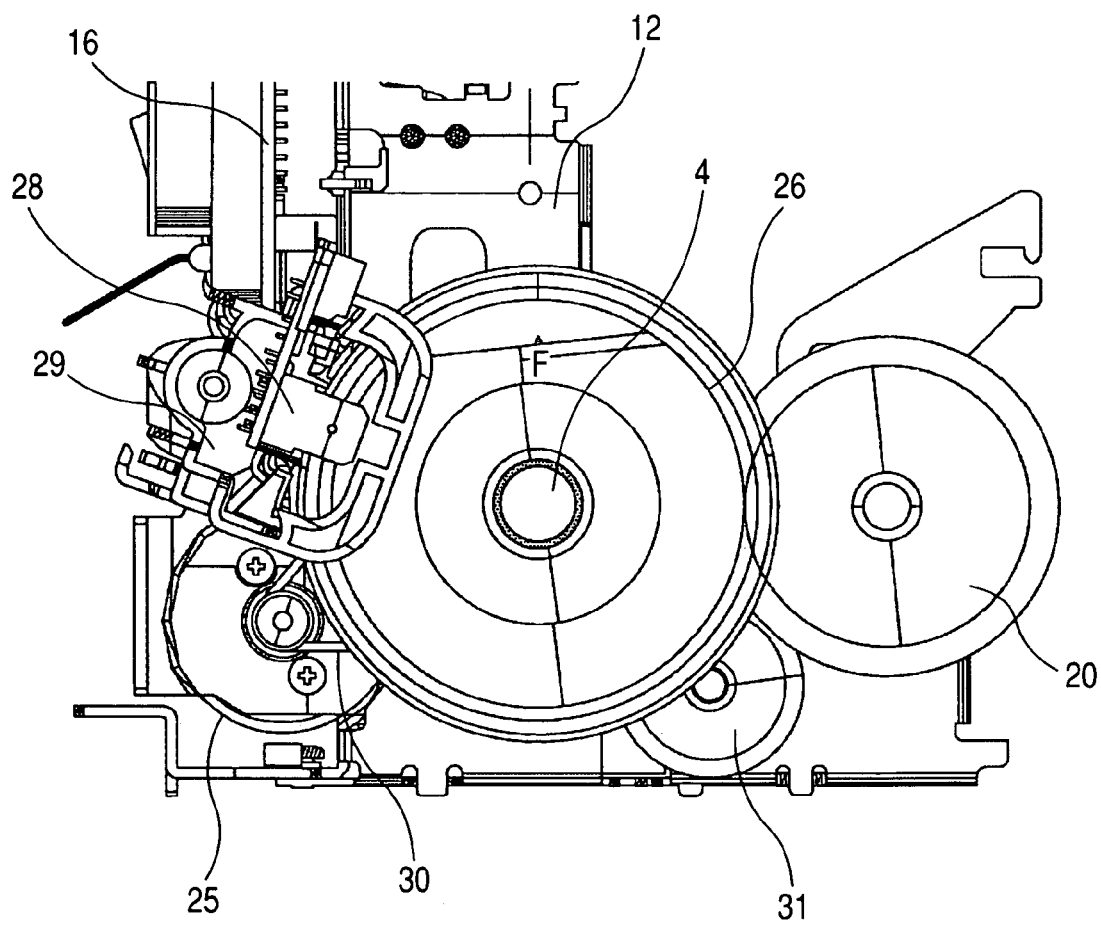
FIG. 2 is a side view of a paper conveying drive system.

FIG. 1 is a perspective view showing the recording apparatus which is commonly used in embodiments described below. FIG. 2 is a side view of a paper conveying drive system.

The recording apparatus includes (A) an automatic paper feed portion, (B) a paper conveying portion, (C) a paper discharge portion, (D) a carriage portion, and (E) a cleaning portion. These common portions will schematically be described in order.

(A) Automatic Paper Feed Portion

The automatic paper feed portion has a configuration in which a pressure plate 1 for loading thereon recording paper P and a feed roller (not shown) for feeding the recording paper P are attached to a base 2. A movable side guide 3 is movably provided in the pressure plate 1 to control a load position of the recording paper P. The pressure plate 1 can be rotated about an axis coupled to the base 2. The pressure plate 1 is biased to the feed roller by a pressure plate spring (not shown).

The recording paper P is conveyed to a nip portion formed by a paper feed roller and a separation roller (not shown) by drive force of a paper feed motor 28. The conveyed recording paper P is separated at the nip portion, and only the uppermost recording paper P is conveyed.

(B) Paper Conveying Portion

The paper conveying portion includes a conveying roller 4 for conveying the recording paper P and a paper position sensor (not shown). A follower pinch roller 5 is provided in the conveying roller 4 while abutting on the conveying roller 4. The pinch roller 5 is held by a pinch roller guide 6. The pinch roller 5 is biased by a pinch roller spring (not shown) to be pressed against the conveying roller 4, which generates conveying force of the recording paper P. A head cartridge 7 which forms an image based on image information is provided on the downstream side in a recording paper conveying direction of the conveying roller 4.

An LF encoder sensor 28 is fixed to an LF encoder holder 29, and the LF encoder holder 29 is attached to a chassis 12. The drive force of an LF motor 25 is transferred to a conveying roller gear 27 through an LF timing belt 30. The conveying roller gear 27 is pressed into and fixed to the conveying roller 4. An LF encoder scale 26 is inserted into the conveying roller 4 and fixed to the conveying roller gear 27. Based on such information on the amount of rotation (velocity) of the conveying roller 4 that is acquired by reading the number of lines of the LF encoder scale 26 with the LF encoder sensor 28, feedback control is performed, which allows the rotation of the LF motor 25 (DC motor) to be controlled to convey the recording paper P. The pinch roller guide 6 and a paper guide (not shown) guide the recording paper P conveyed to the paper conveying portion to convey the recording paper P to a pair of rollers of the conveying roller 4 and the pinch roller 5. At this point, a paper position sensor senses a front end of the recording paper P conveyed, which determines a printing position of the recording paper P. The recording paper P is conveyed on a platen 8 by the pair of rollers 4 and 5 during printing.

(C) Carriage Portion

The carriage portion includes a carriage 9 to which the head cartridge 7 is detachably attached. The carriage 9 is supported by a guide shaft 10 and a guide rail 11. The guide shaft 10 causes the carriage 9 to be reciprocally moved relative to a direction perpendicular to a conveying direction of the recording paper P. The guide rail 11 holds an upper rear end of the carriage 9 to maintain a gap between the recording head 7 and the recording paper P. The guide shaft 10 and the guide rail 11 are attached to the chassis 12.

The carriage 9 is driven by a carriage motor 13 through a timing belt 14. The carriage motor 13 is the DC motor attached to the chassis 12. The timing belt 14 is tensioned and supported by an idle pulley 15. The carriage 9 includes a flexible cable 17 which transmits a head signal from an electric board 16 to the head cartridge 7. A linear encoder (not shown) which detects a carriage position is mounted on the carriage 9. The carriage position can be detected by reading the number of lines of the linear scale 18 attached to the chassis 12. A linear encoder signal is transmitted to the electric board 16 through the flexible cable 17 and processed by the electric board 16.

When the image is to be formed on the recording paper P in the above-described configuration, while the recording paper P is conveyed by the rollers 4, 5 to a line position (position in the conveying direction of the recording paper P) where the image is formed, the carriage 9 is moved to a column position (position perpendicular to the conveying direction of the recording paper P) where the image is formed to oppose the head cartridge 7 to the image forming position by the carriage motor 13 and the feedback control utilizing the linear encoder. Then, the head cartridge 7 ejects ink toward the recording paper P to form the image by the signal from the electric board 16.

(D) Paper Discharge Portion

In the paper discharge portion, spurs (not shown) abut on a paper discharge roller 19 so as to rotatably follow the paper discharge roller 19. The drive is transmitted from the conveying roller gear 27 to the paper discharge roller 19 through a paper discharge transmission gear 31 and a paper discharge roller gear 20. The recording paper P is driven by the above-described configuration, and the image is formed on the recording paper P by the carriage portion. Then, the recording paper P is conveyed while sandwiched by the nip between the paper discharge 19 and the spurs and discharged to a paper discharge tray (not shown) and the like.

(E) Cleaning Portion

The cleaning portion includes a pump 24 which cleans the head cartridge 7, a cap 21 which suppresses the drying of the head cartridge 7, a wiper 22 which wipes a face of the head cartridge 7, and a PG motor 23 which is of a drive source.

Figure 3:
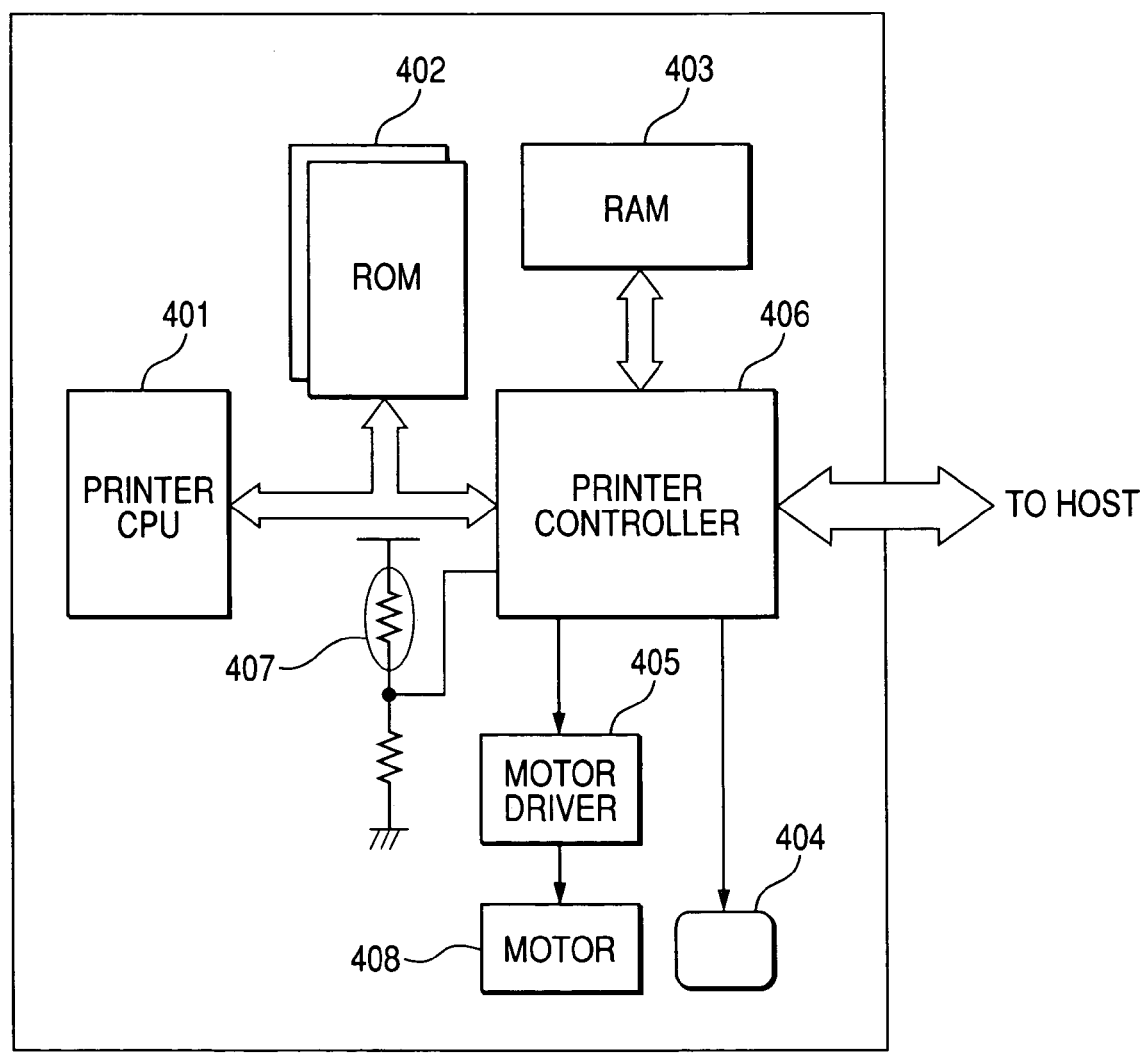
FIG. 3 is a block diagram for explaining a control configuration of a printer.

FIG. 3 is a block diagram for explaining a control configuration of the printer shown in FIG. 2. In FIG. 3, the numeral 401 represents printer CPU which controls the printer apparatus. The printer CPU 401 controls a printing process by utilizing a printer control program, printer emulation, and a printing font which are stored in ROM 402.

The numeral 403 represents RAM in which developed data for the printing and reception data from a host apparatus are stored. The numeral 404 represents a printer head, the numeral 405 represents a motor driver which drives the motor, and the numeral 406 represents a printer controller which performs access control of RAM 403, data exchange with the host apparatus, and control signal transmission to the motor driver. When a DC motor 408 which is of the drive source is driven by the motor driver 405, the printer controller 406 acquires velocity information and position information of the drive source based on the signal from a digital encoder (not shown), and the motor driver 405 is controlled based on the velocity information and position information to perform servo control of the drive source. The numeral 407 represents a temperature sensor formed by a thermistor and the like, which detects a temperature of the printer apparatus.

The printer CPU 401 mechanically and electrically controls the printer main body with the control program in ROM 402. The printer CPU 401 reads an emulation command and the like, which are transmitted from the host apparatus to the printer apparatus, from an I/O data register in the printer controller 406. The printer CPU 401 writes the control corresponding to the command in the I/O data register and an I/O port and reads the control corresponding to the command from the I/O data register and the I/O port.

Figure 4:
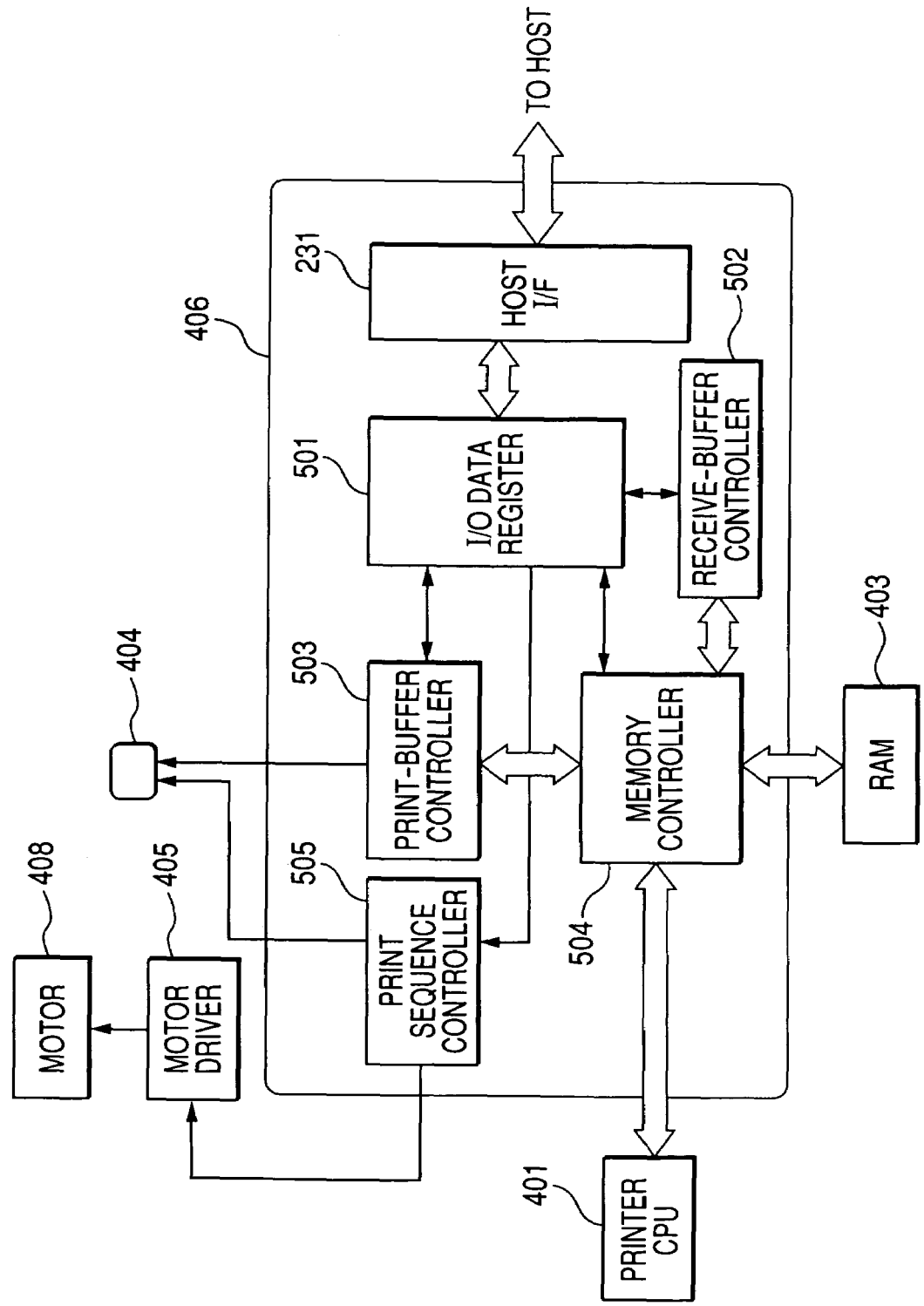
FIG. 4 is a block diagram for explaining in detail a configuration of a printer controller 406.

FIG. 4 is a block diagram for explaining the in detail the configuration of the printer controller 406 shown in FIG. 4. The same components are represented by the same reference numeral, as used in FIG. 3.

In FIG. 4, the numeral 501 represents the I/O register which exchanges the data at a command level with the host apparatus. The numeral 502 represents a reception-buffer controller which directly writes the reception data from the I/O data register 501 into RAM 403.

The numeral 503 represents a print-buffer controller. During the printing, the print-buffer controller 503 reads the recording data from a recording data buffer in RAM 403 to transmit the recording data to the printer head 404. The numeral 504 represents a memory controller which controls memory access from three directions to RAM 403. The numeral 505 represents a print sequence controller which controls a print sequence. The numeral 231 represents a host interface which conducts communication with the host apparatus.

Figure 5:
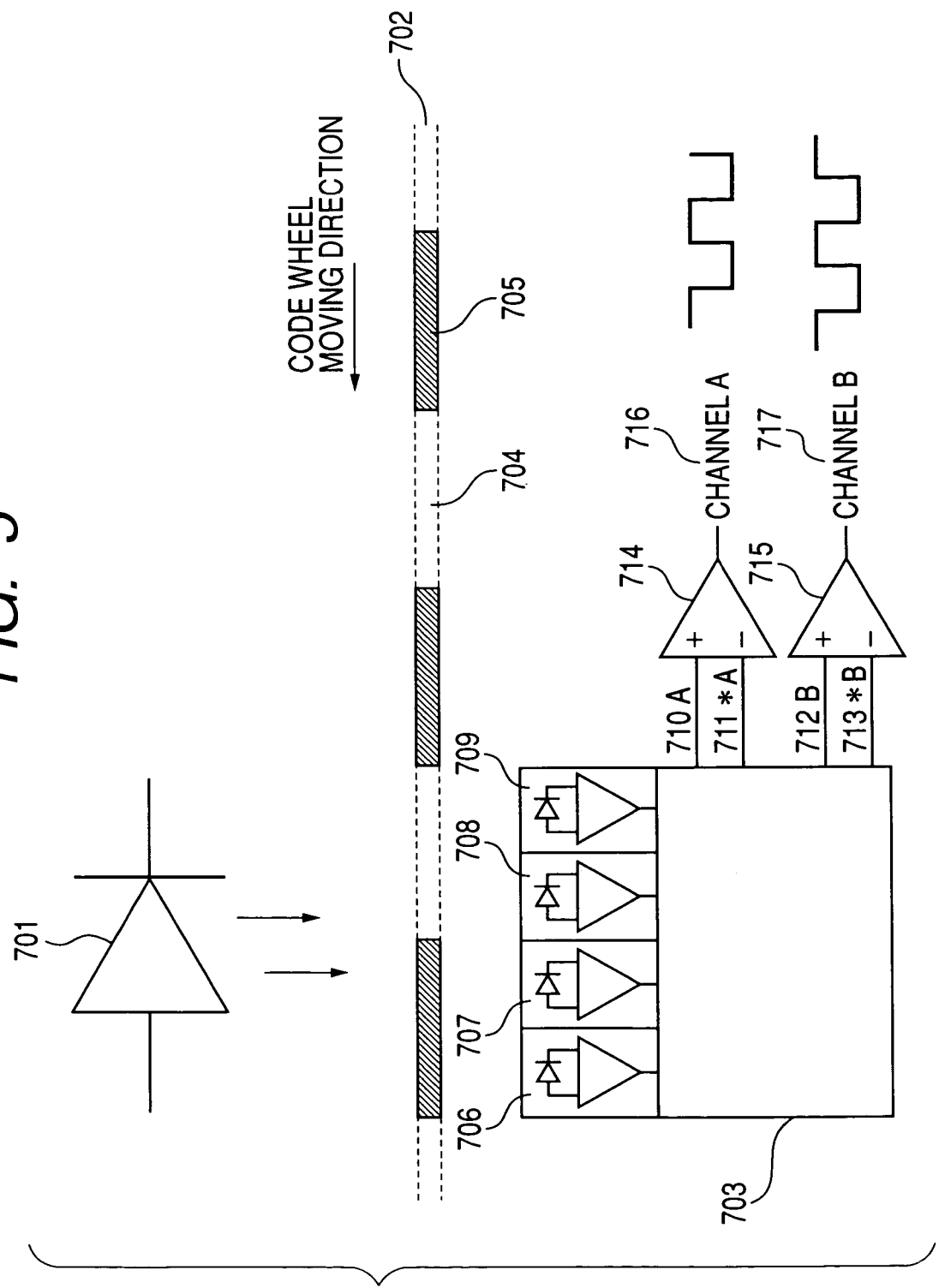
FIG. 5 shows a model of a digital encoder.

FIG. 5 shows an operation principal of a digital encoder used in the control of the DC motor. The digital encoder shown in FIG. 5 is an optical encoder having the configuration in which LED 701 emits light and the signal is generated by detecting the light passing through a code wheel 702 with a detector 703.

Parts 704 through which the light is transmitted and parts 705 through which the light is not transmitted are alternately arranged at predetermined intervals in the code wheel 702. Photodetectors 706, 707, 708, and 709 are arranged at predetermined intervals in the detector 703. The lights detected by the photodiodes 706, 707, 708, and 709 are converted into electric signals A(710), *A(711), B(712) and *B(713), respectively. The electric signals A(710), *A(711), B(712) and *B(713) are output to comparators 714 and 715, and the comparators 714 and 715 output rectangular waveform channels A(716) and B(717) which are of differential output.

Generally, phase difference of 90° exists between the channels A(716) and B(717), the number of pulses of the rectangular wave has a correlation with the number of slits of the code wheel 702, and a frequency of the rectangular wave has a correlation with moving velocity of the slit. That is, the position information of the drive body can be acquired by counting the number of pulses of the rectangular wave, and the velocity information of the drive body can be acquired by measuring a period of the rectangular wave.

In the signal output from the digital encoder, there is a possibility that noise is generated by various causes. In order to eliminate influence of the noise, generally the signal output from the digital encoder is used by passing the signal through a digital LPF (low-pass filter).

At this point, with reference to acquiring timing of the position information and the velocity information, there can be considered various cases such as the timing between the same edges of the one-side signals of the channel A(716) or B(717), the timing between the different edges of the one-side signals of the channel A(716) or B(717), and the timing between all the edges of the channels A(716) and B(717). That is, it is always not necessary that the acquiring timing of the position information corresponds to that of the velocity information.

Figure 6:
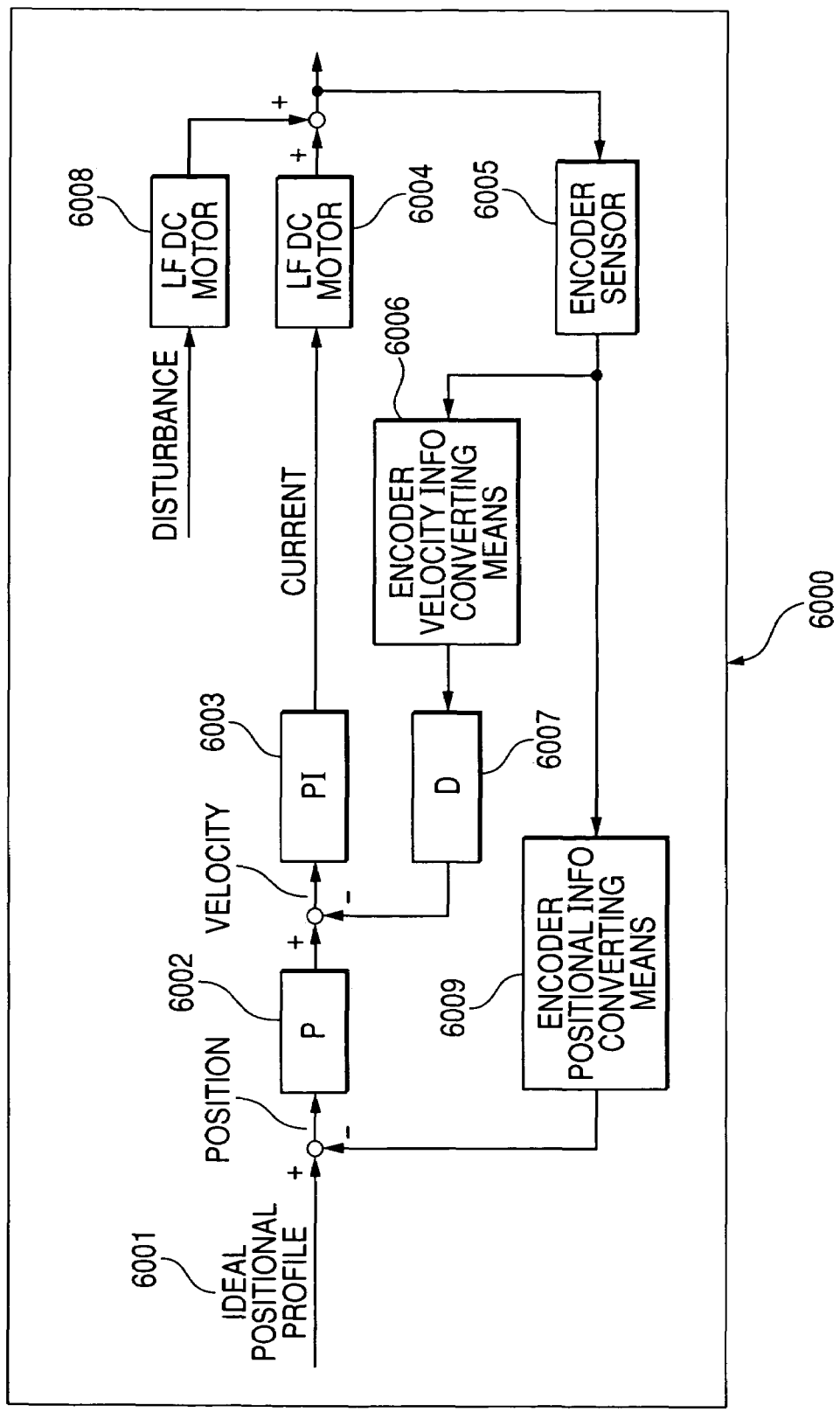
FIG. 6 is a block diagram for explaining a positional control system of a DC motor.

FIG. 6 is a block diagram for explaining a positional control system of the general DC motor, and FIG. 6 shows a technique in the case of positional servo. The DC motor is controlled by the technique referred to as PID control or classical control. A procedure of the technique will be described below.

A target position given to a control subject is given in a form of an ideal positional profile 6001. In the apparatus of the embodiment, the ideal positional profile 6001 corresponds to an absolute position where the recording paper conveyed by the LF motor should reach. As time elapses, the position information is changed. The drive of the apparatus of the embodiment is achieved by performing variable value control to the ideal positional profile 6001.

The apparatus includes an encoder sensor 6005 which detects the physical rotation of the motor. An encoder positional information converting means 6009 is one which acquires absolute position information by adding the number of slits detected by the encoder sensor 6005. An encoder velocity information converting means 6006 is one which calculates current drive velocity of the LF motor from the signal of the encoder sensor 6005 and a clock built in the printer.

A value obtained by subtracting the actual physical position acquired by the encoder positional information converting means 6009 from the ideal positional profile 6001 is set to a position error necessary to the target position, and the position error is passed to a positional servo feedback process from 6002. The numeral 6002 is a major loop of the positional servo, and means for performing the calculation with respect to a proportional term P is commonly known as the major loop of the positional servo.

A velocity command value is output as a result of the calculation in 6002. The velocity command value is passed to a velocity-servo feedback process from 6003. Means for performing PID calculation which calculates the proportional term P, an integral term I, and a derivative term D is commonly known as a minor loop of the velocity servo.

In the apparatus of the embodiment, in order to improve tracking characteristics when the nonlinear change in velocity command value is generated and to prevent a harmful effect of derivative calculation in the variable value control, the technique usually referred to as derivative precedence type, encoder velocity information acquired in 6006 is passed through derivative calculation of 6007 before taking the difference between the encoder velocity information and the velocity command value acquired in 6002. The technique itself is not the subject of the invention. Sometimes it is sufficient only to perform the derivative calculation in 6003 depending on characteristics of a control subject system.

In the minor loop of the velocity servo, a value obtained by subtracting the encoder velocity information from the velocity command value is set to a velocity error necessary to the target velocity, and the velocity error is passed to a PI calculation circuit 6003. At that point, energy which should be given to the DC motor is calculated by the technique referred to as PI calculation. In a motor driver circuit which receives the energy, for example, by using means for changing a pulse width of the applying voltage (hereinafter referred to as PWM (Pulses Width Modulation) control) while setting a motor applying voltage constant, duty of applying voltage is changed to adjust a current value and the energy given to a DC motor 6004 is adjusted in order to perform the velocity control.

The current value is applied to the DC motor to rotate the DC motor. The DC motor is physically rotated while affected by the disturbance of 6008, and the output of the DC motor is detected by the encoder sensor 6005.

Figure 7:
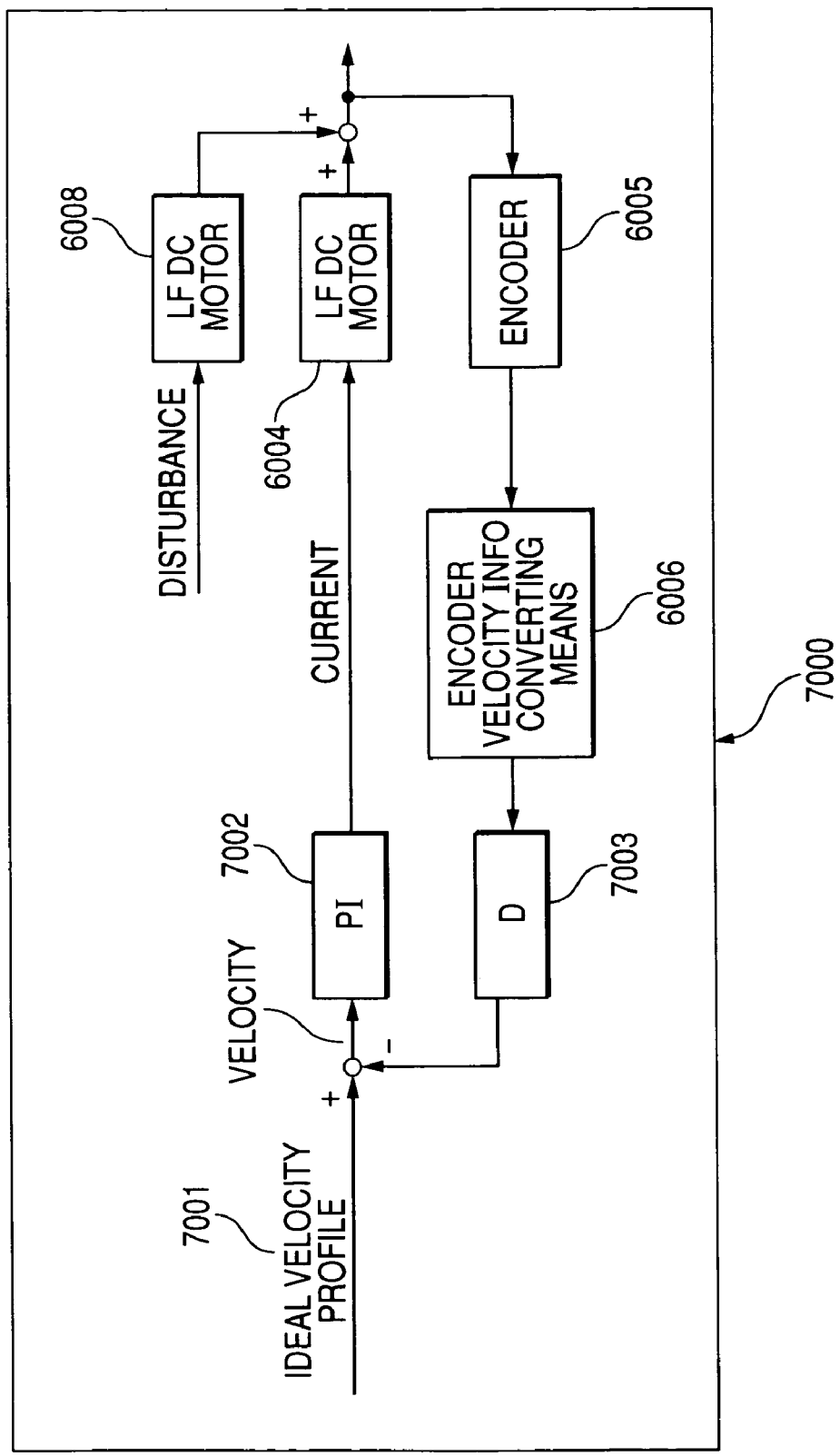
FIG. 7 is a block diagram for explaining a velocity control system of the DC motor.

FIG. 7 is a block diagram for explaining a velocity control system of the usual DC motor, and FIG. 7 shows the technique in the case of velocity servo. The DC motor is controlled by the technique referred to as PID control or classical control. The procedure of the technique will be described below.

A target velocity given to the control subject is given in a form of an ideal velocity profile 7001. In the sheet member conveying device, the ideal velocity profile 7001 is ideal velocity in which the recording paper conveyed should be conveyed by the LF motor at a corresponding time, and the ideal velocity profile 7001 corresponds to the velocity command value at the corresponding time. As the time elapses, the velocity information is changed. The drive of the apparatus is achieved by performing the variable value control to the ideal velocity profile 7001.

The means for performing the PID calculation which calculates the proportional term P, the integral term I, and the derivative term D is commonly known in the velocity servo. In the apparatus of the embodiment, in order to improve the tracking characteristics when the nonlinear change in velocity command value is generated and to prevent the harmful effect of the derivative calculation in the variable value control, the technique usually referred to as derivative precedence type, the encoder velocity information acquired in 6006 is passed through the derivative calculation of 7003 before taking the difference between the encoder velocity information and, the velocity command value acquired in 7001. The technique itself is not the subject of the invention. Sometimes it is sufficient only to perform the derivative calculation in 7002 depending on the characteristics of the control subject system.

In the velocity servo, the value obtained by subtracting the encoder velocity information from the velocity command value is set to the velocity error necessary to the target velocity, and the velocity error is passed to a PI calculation circuit 7002. At that point, the energy which should be given to the DC motor is calculated by the technique referred to as PI calculation, and the motor driver circuit receives the energy. The motor driver circuit changes ON/OFF of the output or the duty in a torque generation direction by using the PWM control to adjust mean torque generated by the DC motor 6004, which allows the velocity control to be performed.

The DC motor is physically rotated while affected by the disturbance of 6008, and the output of the DC motor is detected by the encoder sensor 6005. For example, in the usual paper conveying control of the paper conveying portion, the control is performed by the positional servo in an acceleration-control area post after driving the DC motor, a constant-velocity-control area, and a deceleration-control area, and the control is performed by the velocity servo so that specified velocity is achieved in a positioning control area near the target position. When the driven body reaches the target stop position, the torque of the DC motor is dropped down to zero to stop the driven body. However, when torque is dropped down to zero at the target stop position, the position of the driven body is slightly turned back due to the elastic deformation charging force and the like.

Therefore, in a first embodiment described below, considering the fact that the driven force is slightly moved in the reverse direction and the stop position is consequently turned back, the driven body is caused to proceed by the amount of turn-back of the driven body to drop down the torque to zero.

First Embodiment

Figure 8B:
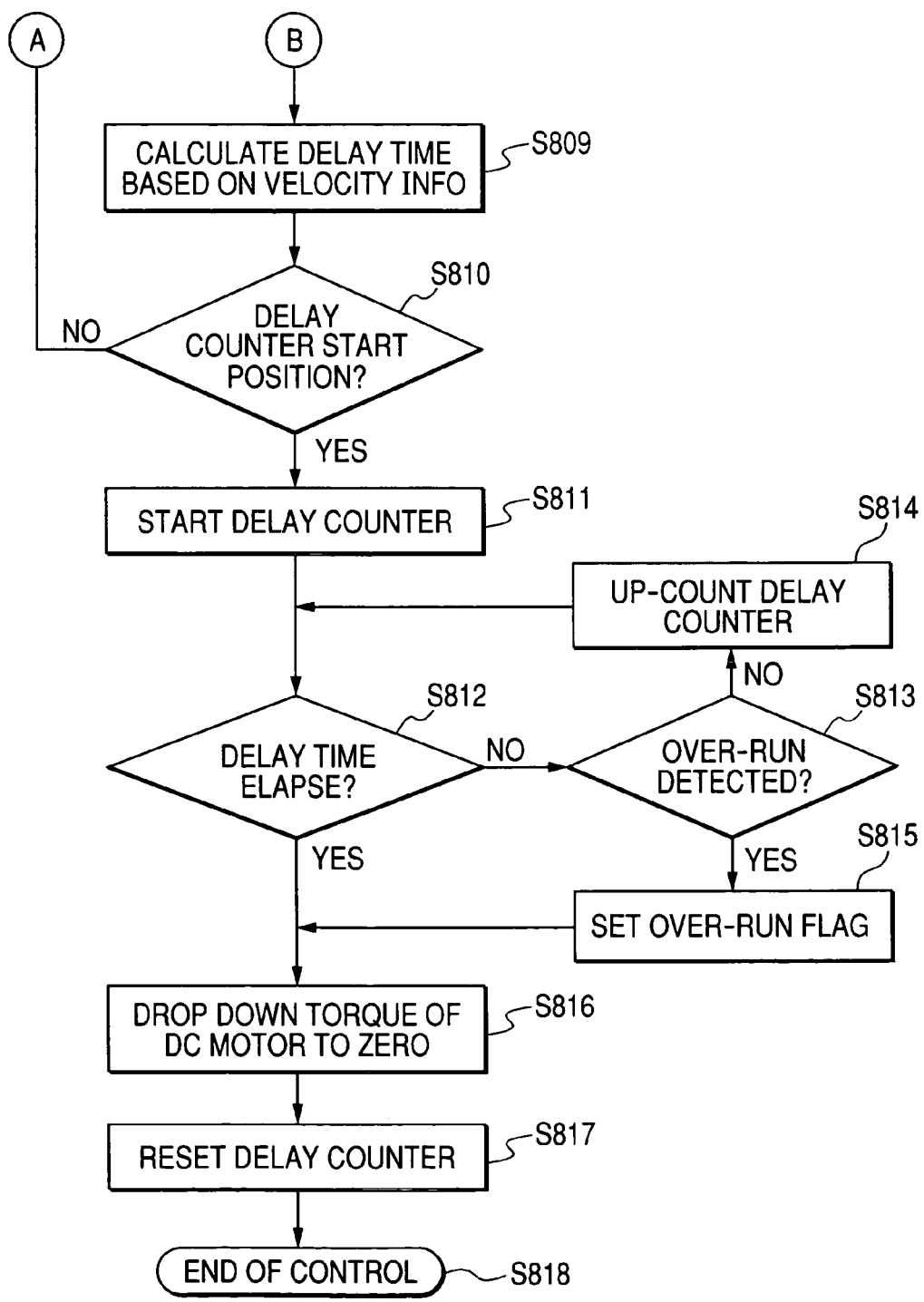
Figure 12A:
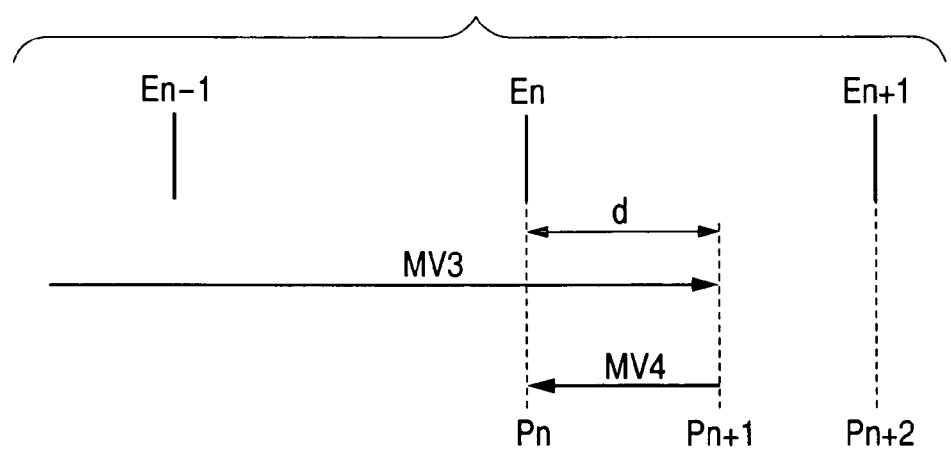
FIGS. 12A and 12B are explanatory views concerning the stop position in the first embodiment, and a third embodiment, respectively.

FIGS. 8A and 8B illustrate a flow chart showing the control in the first embodiment. FIG. 12A is a view for explaining the movement of a moving body in the first embodiment. En−1, En, and En+1 represent a position signal based on the signal of the encoder. An arrow MV3 shows that a front end position of the recording medium conveyed by conveying means is moved to a distance d from timing of En and then the stopping process is performed. This allows the front end of the recording medium to be stopped at a position Pn+1. For the sake of convenience, it is assumed that the moving distance becomes zero until the front end is stopped after the stopping process is performed. As a result, the front end is moved by the distance d due to the elastic deformation charging force and stopped at a position Pn (arrow MV4).

Referring to FIGS. 8A and 8B, the processing will be described. After the DC motor is started to be driven (S801), in the acceleration-control area (S802), the positional servo is performed with parameters of the acceleration-control area (S803). When the front end of the recording medium is moved to the constant-velocity-control area from the acceleration-control area (S804), the positional servo is performed with parameters of the constant-velocity-control area (S805). When the front end of the recording medium is moved to the deceleration-control area from the constantvelocity-control area (S806), the positional servo is performed with parameters of the deceleration-control area (S807).

When the front end of the recording medium reaches the specified position near the target stop position from the deceleration-control area (S806), the positional servo is changed to the velocity servo (S808) to maintain the predetermined velocity. At this point, each servo control is performed in each specified servo period. When the servo control does not reach the servo period, the servo control is skipped. Then, the calculation of a delay time from the target stop position is performed based on the velocity information (S809).

In the calculation of S809, the moving time is calculated from the distance d by the elastic deformation charging force and the moving velocity. In the moving velocity, the velocity information of the position located by the predetermined distance in front of the stop position Pn is used. Therefore, even if the velocity is varied in each operation (paper feed operation), the delay time can be accurately calculated.

When the front end of the recording medium reaches the target stop position Pn which is of a delay start position (S810), a counter for counting the delay time is started (S811).

Then, it is determined whether the delay time has elapsed or not (S812). When the delay time has not elapsed (N in S812), it is determined whether the front end of the recording medium reaches a position Pn+2 located by the predetermined distance away from the target stop position or not (S813). For example, in FIG. 12, it is checked whether the signal En+1 is input or not. When the signal En+1 is input, it can be assumed that the front end of the recording medium reaches the position Pn+2 (when the signal En+1 is not input, the front end of the recording medium does not reach the position Pn+2).

When the front end of the recording medium does not reach the position Pn+2 (N in S813), up-count of the delay counter is performed according to a reference clock signal of time count (S814). When the front end of the recording medium reaches the position Pn+2 (Y in S813), the signal indicating over-run is output (S815). It is also possible that a flag indicating the over-run is set in a predetermined memory area. Then, the process for dropping down the torque of the DC motor to zero is performed (S816).

When the delay time has elapsed (Y in S812), the process for dropping down the torque of the DC motor to zero is performed (S816). The delay counter is reset (S817) and the control is ended (S818).

As described above, the delay counter performs the counting from the reference position Pn up to the timing when the stopping processing is performed. When the delay counter counts out, the stopping process is performed. Further, it is checked whether the input of the next position signal is present or absent until the up-count of the delay counter is performed.

Figure 9:
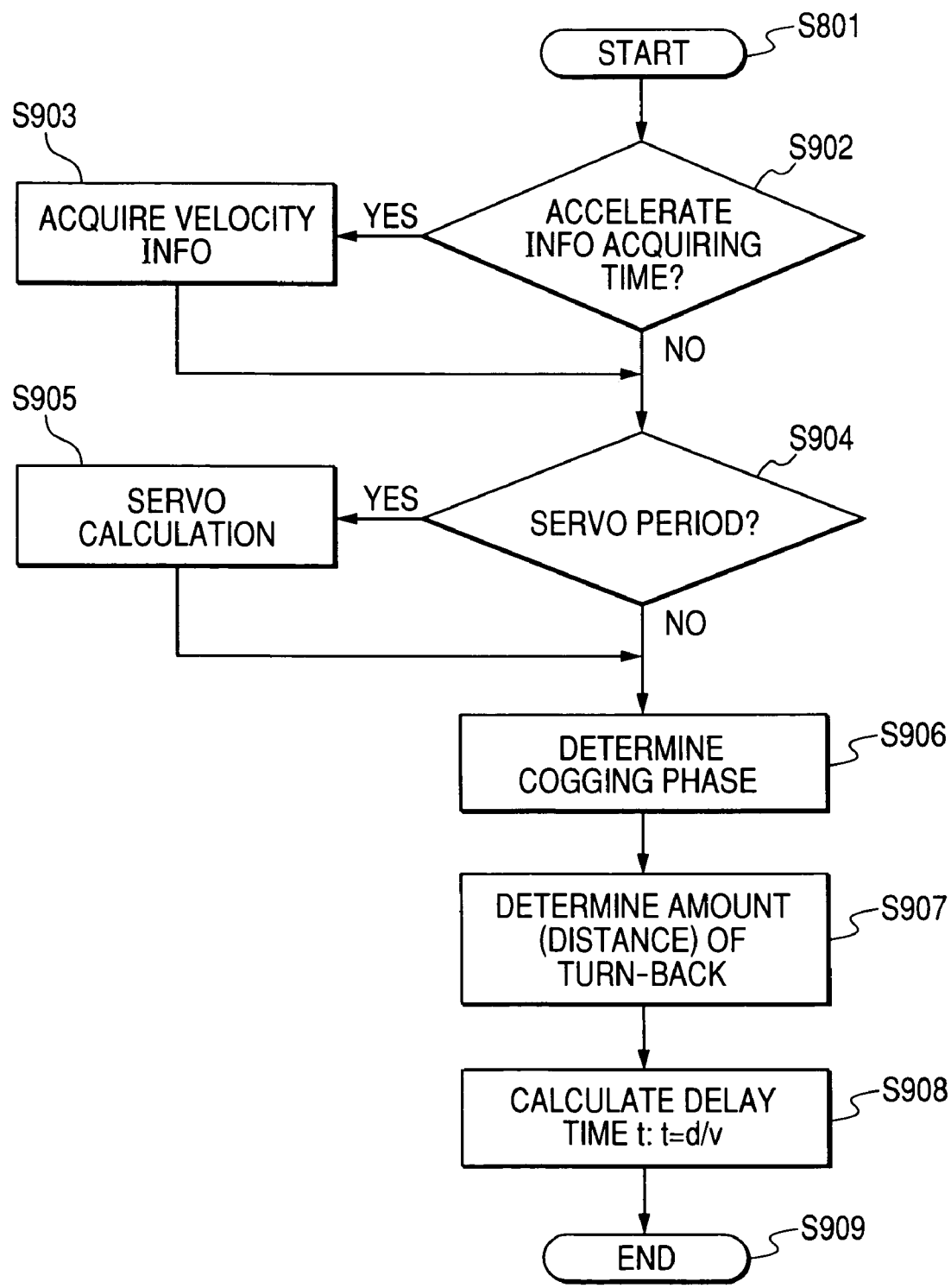
FIG. 9 is a flow chart for explaining details of velocity servo and delay time calculation.

FIG. 9 is a flow chart for explaining details of velocity servo (S808) of FIG. 8A and the delay time calculation (S809) of FIG. 8B.

In FIG. 9, the delay time is calculated by using the latest velocity information before performing the delay time and the amount of turn-back d based on the cogging of the motor.

When the front end of the recording medium reaches the velocity servo area near the target stop position (S901), whether it is the timing for acquiring the velocity information or not is determined (S902). In the case of the digital encoder, because the velocity information cannot be determined unless the edge of the encoder signal is generated, the velocity information is determined in a discrete manner. When it is the timing for acquiring the velocity information (Y in S902), the velocity information is acquired (S903). Then, the determination of the servo period is performed (S904). The servo calculation is usually performed every predetermined interval (for example, 1 ms).

The servo calculation is performed based on the latest velocity information (updated velocity information) previously acquired in each servo period (S905). A torque control signal of the DC motor is controlled according to the result of the servo calculation. Then, the determination of a cogging phase is performed (S906).

The method of determining the cogging phase is to perform the servo control at predetermined constant velocity (low velocity) to acquire the velocity information of one period of the motor corresponding to the position information. The cogging phase characteristics are learned in one period of the motor by analyzing a fluctuation in periodic velocity from the acquired position information and velocity information. The determination of the cogging phase is performed based on the information on the cogging phase characteristics (S906). The amount of turn-back d is calculated (S907) by the result of determination of the cogging phase (S906) and the velocity information determined in the previous process (S903). It is also possible that the calculation of the amount of turn-back d is performed based on either the result of determination of the cogging phase (S906) or the velocity information determined in the previous process (S903).

The method of calculating the amount of turn-back d is to previously store a table concerning the amount of turn-back d based on the information on the cogging phase and the velocity information in a non-volatile memory to acquire the information on the amount of turn-back d from the information on the cogging phase and the velocity information. Needless to say, it is also possible that the table in which only either the information on the cogging phase or the velocity information is set to the parameter is stored in the non-volatile memory to acquire the information on the amount of turn-back d. Then, the delay time t is calculated (S908), and the process is ended. After the process, the step proceeds to the determination (S810) of the delay start position of FIG. 8B.

Since the target stop position is previously learned, in the system having relatively good stopping accuracy, the cogging phase (S906) can be determined before starting the drive of the motor. In this case, the determination of the cogging phase (S906) can be skipped in the control flow shown in FIG. 9. When the influence of the cogging can be neglected, the determination of the cogging phase (S906) can be also skipped in the control flow shown in FIG. 9.

As described above, since the process is performed in consideration of the force generated in stopping the DC motor such as the elastic deformation charging force, the stopping accuracy is improved.

Second Embodiment

Figure 10B:
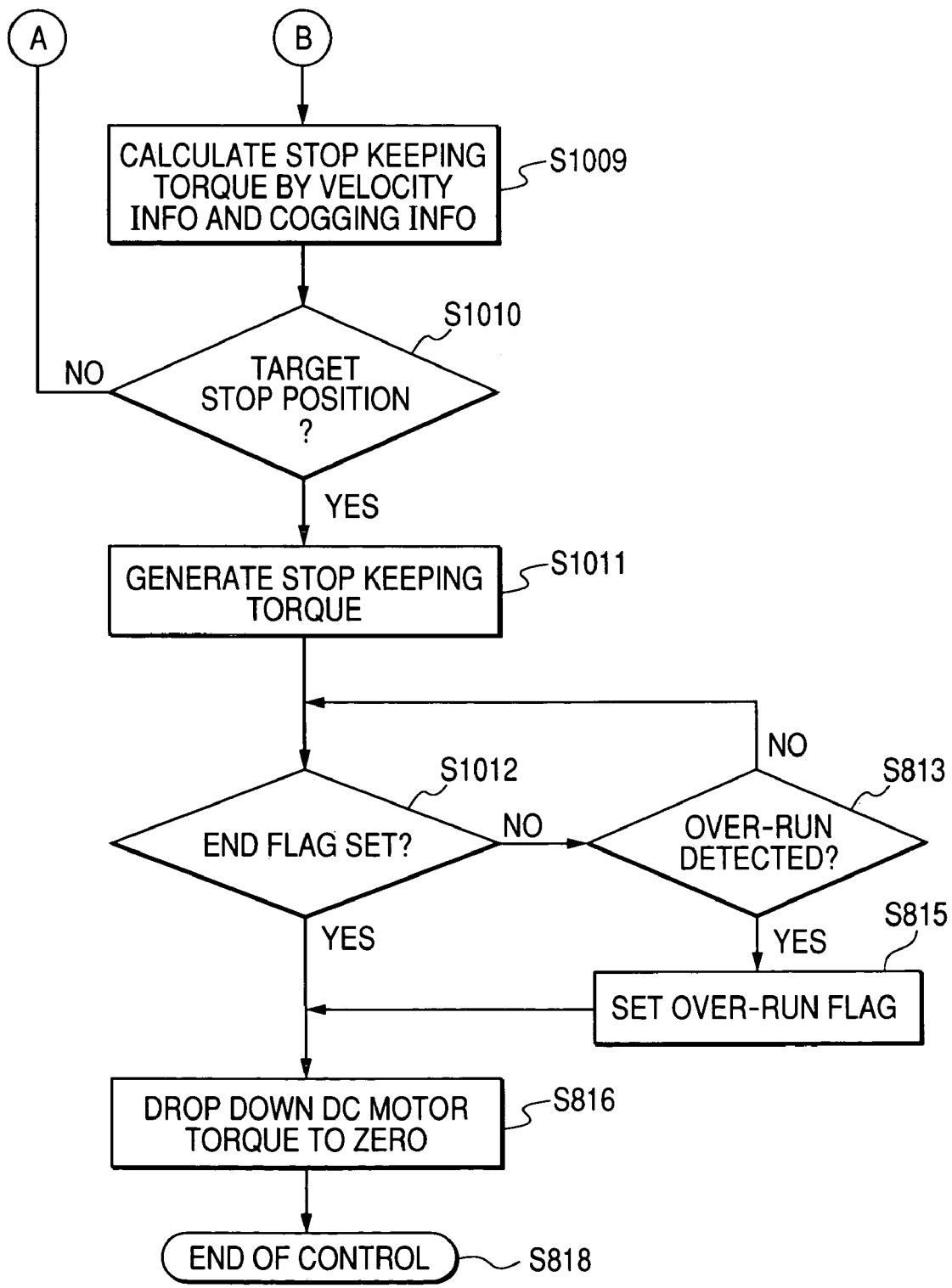
Figure 11:
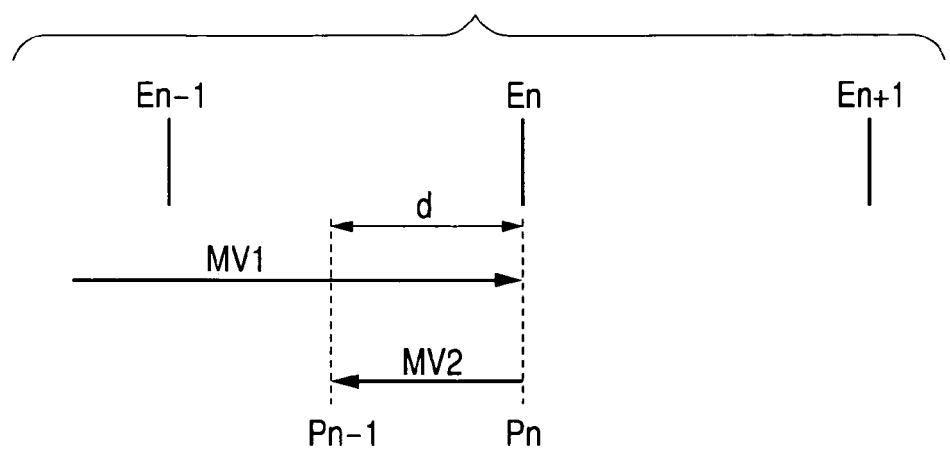
FIG. 11 is an explanatory view concerning the stop position in the related art.

FIGS. 10A and 10B illustrate a flow chart showing the control in a second embodiment. The description of the same process as the first embodiment will be neglected, and the process different from the first embodiment will be described.

After the DC motor is started to be driven (S801), as described in the first embodiment, the processes up to the velocity servo process (S808) are performed along the control flow.

In S1009, the magnitude of stop keeping torque (stop position torque) is calculated at the target stop position based on the velocity information and the cogging phase information. The magnitude of the stop keeping torque is the weak amount of torque of the order in which moving force caused by the elastic deformation charging force is canceled (balanced).

The amount of torque is changed by the velocity and the cogging phase at the target stop position. Therefore, the table with respect to the amount of torque in which the velocity information and the cogging phase information are set to the parameter is previously stored in the memory (for example, non-volatile memory). The corresponding torque value is read from the memory based on the velocity information and the cogging phase information.

Then, the determination of target stop position is performed (S1010). When the front end of the recording medium reaches the target stop position, the control signal is output to the motor (or a motor control circuit, motor driver, or the like) so that the calculated stop keeping torque (stop position torque) is output (S1011). This allows the stop state to be kept (the front end of the recording medium is not moved from the desired stop position) when the stop keeping torque is balanced with the elastic deformation charging force.

A process end flag indicating the predetermined timing is confirmed (S1012). The predetermined timing is the timing of termination or start of another operation. Specifically, when the control flow of the embodiment is applied to the process for stopping the conveying means of the serial printer, the stop timing of the main scanning operation of the carriage and the end timing of the ink ejection of the recording head in the main scanning operation of the carriage can be cited as an example of the predetermined timing.

When the end flag is not set (N in S1012), it is confirmed whether the stop state is kept or not. Therefore, whether the front end of the recording medium reaches the previously specified position relative to the target stop position or not is determined (S813). This is the same process as that described in the first embodiment.

That is, when the calculated stop keeping torque (stop position torque) is larger than the elastic deformation charging force depending on the state of the apparatus, the stop state can not be kept and the front end of the recording medium will be moved. In this case, the process for inputting the signal En+1 is performed.

When the end flag is set (N in S1012), the control flow is transferred to the process for dropping down the DC motor torque to zero (S816).

As described above, according to the second embodiment, the force canceling the elastic deformation charging force can be output in stopping the DC motor to keep the stop state, and the improvement of the stopping accuracy can be realized.

Third Embodiment

Figure 12B:
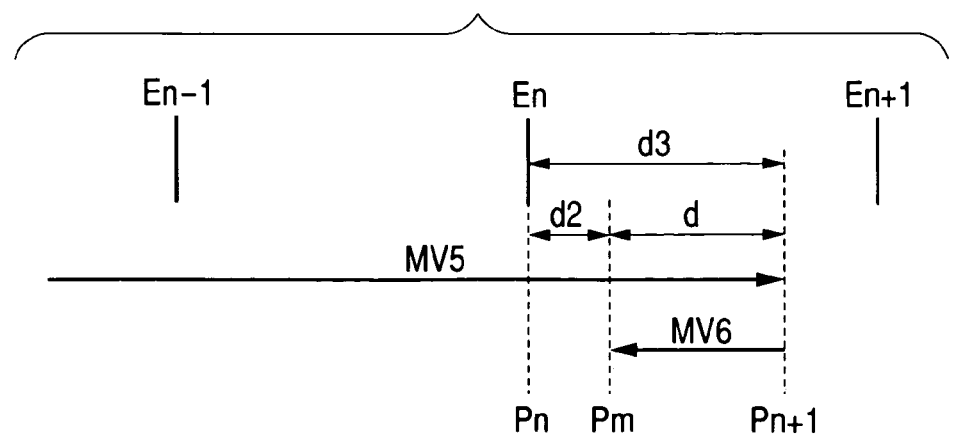

FIG. 12B is a view for explaining the movement of a moving body in a third embodiment. Only when a target stop position Pm is located between the position signals En and En+1 based on the encoder signal, the third embodiment differs from the first embodiment in the operation. Therefore, because only calculation contents of the delay time in S809 are the different point, the control flow of FIGS. 8A and 8B can be applied.

A distance d2 between the desired stop position Pm and the position Pn is determined in the process for calculating the delay time. Then, d3 is determined by adding the value d2 and the distance d turned back by the elastic deformation charging force.

As shown by an arrow MV5, the front end of the recording medium can be stopped at the stop position Pn+1 by calculating d3. Then, the front end of the recording medium is moved to an arrow MV6 by the elastic deformation charging force, and the front end of the recording medium can be stopped at the target stop position Pm.

As described above, the process can be performed in consideration of the force generated in stopping the DC motor such as the elastic deformation charging force and the front end of the recording medium can be stopped with resolution higher than that of the encoder signal, so that the stopping accuracy can be further improved.

Other Embodiments

The method of calculating the velocity in order to correct the distance (the amount of turn-back) d moved by the elastic deformation charging force is not limited to the above-described method. For example, the velocity value (target velocity in the velocity servo area) which is of the control parameter of the velocity servo can be used. Therefore, when the fluctuation in velocity is small in each operation, it is not necessary to perform the calculation in each operation (for example, in each conveying operation), so that the load of the motor control can be decreased.

Although the distance (the amount of turn-back) d moved by the elastic deformation charging force is dealt with as the constant value in the above-described embodiment, it is also possible that the distance (the amount of turn-back) d is a variable (parameter) calculated based on the state of the apparatus. For example, it is also possible that the distance (the amount of turn-back) d moved by the elastic deformation charging force is calculated by the information such as a friction coefficient between the recording medium which is of the moving body and the conveying path. For example, it is also possible that the distance (the amount of turn-back) d is calculated based on the type or the size of the recording medium conveyed by the conveying means, or it is also possible that the distance (the amount of turn-back) d is calculated by the information on the cogging of the motor of the conveying means or the transferring means (gear). The period or the magnitude of the cogging can be cited as the information on the cogging. In addition, it is also possible that the distance (the amount of turn-back) d is calculated by considering the influence of the mechanical and periodic disturbance, or it is also possible that the distance (the amount of turn-back) d is calculated by combining these factors.

Although the control of the conveying means for conveying the recording medium such as recording paper is described in the recording apparatus using the recording head, for example, the control of the conveying means of the invention can be applied to an image input apparatus for reading the image of an original.

Although the conveyance of the recording medium is described, the invention is not limited to the recording apparatus. For example, in an electronic instrument or an electronic apparatus such as an inspection apparatus, the invention can be applied to the control for moving the moving body such as a stage.

This application claims priority from Japanese Patent Application No. 2003-372459 filed Oct. 31, 2003, which is hereby incorporated by reference herein.

What is claimed is:

1. A DC motor control apparatus comprising:
   a DC motor;
   moving means for receiving drive torque from the DC motor to move a driven body, wherein the moving means includes a torque transmission member which transmits torque from the DC motor, and a predetermined force is generated from the torque transmission member at a stop timing of the driven body;
   encoder means for periodically outputting a pulse signal according to movement of the driven body;
   information acquiring means for acquiring velocity information and position information of the driven body based on a time interval of the pulse signal;
   controlling means for controlling the moving means based on the velocity information and the position information acquired by the information acquiring means;
   calculating means for calculating a time required in order that the driven body travels a distance corresponding to the amount of shift of a stop position of the driven body by the predetermined force based on at least one of a phase for mechanical periodic disturbance of the moving means, velocity information at a time before a predetermined time period from timing when a stopping process should be performed, a velocity parameter of the controlling means, and a change in load owing to moving conditions; and
   determining means for determining timing when the stopping process for stopping the driven body should be performed based on the time calculated by the calculating means,
   wherein the controlling means performs the stopping process for stopping the driven body based on the timing when the stopping process should be performed.

2. A DC motor control apparatus according to claim 1, wherein the mechanical periodic disturbance of the moving means is based on cogging of the DC motor.

3. A DC motor control apparatus according to claim 1, wherein the moving conditions are a type of the driven body and a moving path of the driven body.

4. A DC motor control apparatus according to claim 1, wherein the controlling means performs the stopping process for stopping the driven body when the encoder means detects that the driven body travels a predetermined distance before the elapse of the time.

5. A recording apparatus which uses a recording head to perform recording on a recording medium, the recording apparatus comprising:
   a DC motor;
   conveying means for receiving drive torque from the DC motor to move the recording medium, wherein the conveying means includes a torque transmission member which transmits torque from the DC motor, and a predetermined force is generated from the torque transmission member at a stop timing of the recording medium;
   encoder means for periodically outputting a pulse signal according to action of the conveying means;
   information acquiring means for acquiring velocity information and position information of the conveying means based on a time interval of the pulse signal;
   controlling means for controlling the conveying means based on the velocity information and the position information acquired by the information acquiring means;
   calculating means for calculating a time required in order that the recording medium travels a distance corresponding to the amount of shift of a stop position of the recording medium by the predetermined force based on at least one of a phase for mechanical periodic disturbance of the conveying means, velocity information at a time before a predetermined time period from timing when a stopping process should be performed, a velocity parameter of the controlling means, and a change in load owing to moving conditions; and
   determining means for determining timing when the stopping process for stopping the recording medium should be performed based on the time calculated by the calculating means,
   wherein the controlling means performs the stopping process for stopping the recording medium based on the timing when the stopping process should be performed.

* * * * *